United States Patent
Hoffman et al.

(10) Patent No.: US 6,663,776 B2
(45) Date of Patent: Dec. 16, 2003

(54) HIGH STRENGTH SIC FILTER AND METHOD FOR THE MANUFACTURE THEREOF

(75) Inventors: William Isaac Hoffman, Hendersonville, NC (US); Rudolph A. Olson, III, Hendersonville, NC (US)

(73) Assignee: Selee Corporation, Hendersonville, NC (US)

(*) Notice: Subject to any disclaimer, the term of this patent is extended or adjusted under 35 U.S.C. 154(b) by 0 days.

(21) Appl. No.: 10/256,844

(22) Filed: Sep. 27, 2002

(65) Prior Publication Data

US 2003/0062303 A1 Apr. 3, 2003

Related U.S. Application Data

(60) Provisional application No. 60/327,420, filed on Oct. 3, 2001.

(51) Int. Cl.$^7$ .......................... B01D 39/20; C04B 38/00; B29C 65/02
(52) U.S. Cl. ................ 210/510.1; 210/503; 264/41; 264/42; 264/43; 264/44; 501/80; 501/81; 501/88; 501/133
(58) Field of Search .................. 210/503, 506, 210/510.1; 264/41, 42, 43, 44; 501/80, 81, 88, 133

(56) References Cited

U.S. PATENT DOCUMENTS

| | | |
|---|---|---|
| 3,893,917 A | 7/1975 | Pryor et al. |
| 3,947,363 A | 3/1976 | Pryor et al. |
| 3,962,081 A | 6/1976 | Yarwood et al. |
| 4,024,212 A | 5/1977 | Dore et al. |
| 4,075,303 A | 2/1978 | Yarwood et al. |
| 4,610,832 A | 9/1986 | Brockmeyer |
| 4,975,191 A | 12/1990 | Brockmeyer et al. |
| 5,190,897 A | 3/1993 | Azumi |
| 5,520,823 A | 5/1996 | Jones et al. |
| 6,245,698 B1 | 6/2001 | Pope et al. |

*Primary Examiner*—John Kim
(74) *Attorney, Agent, or Firm*—Carter Schnedler & Monteith

(57) ABSTRACT

There is provided an improved ceramic foam filter for use in filtering molten metals, metal prepared from a ceramic slurry containing silicon carbide, a colloidal silica binder and at least 10 percent of fumed silica. The filter has enhanced strength properties.

16 Claims, 2 Drawing Sheets

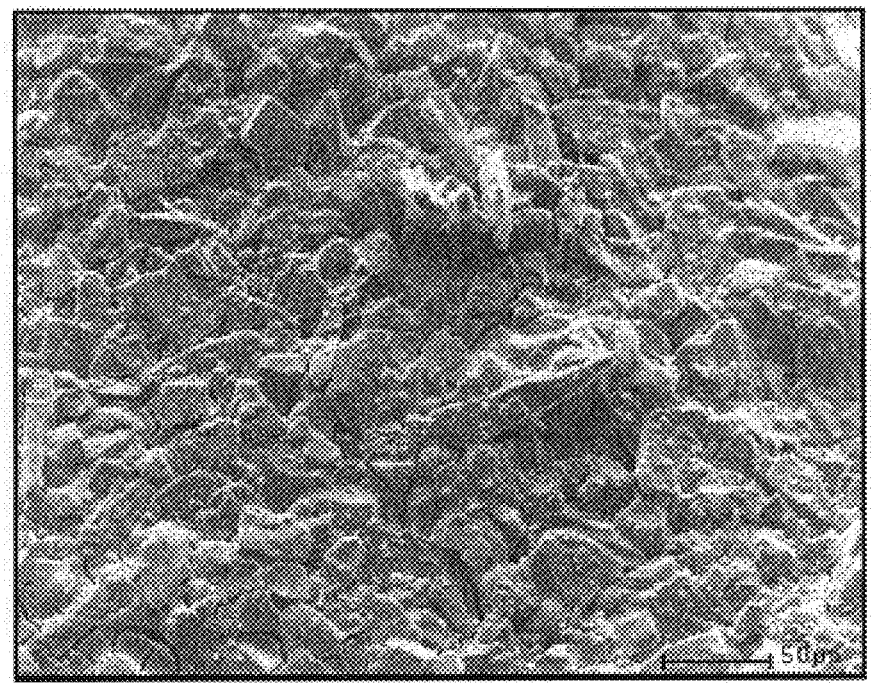
FIGURE 1 – PRIOR ART
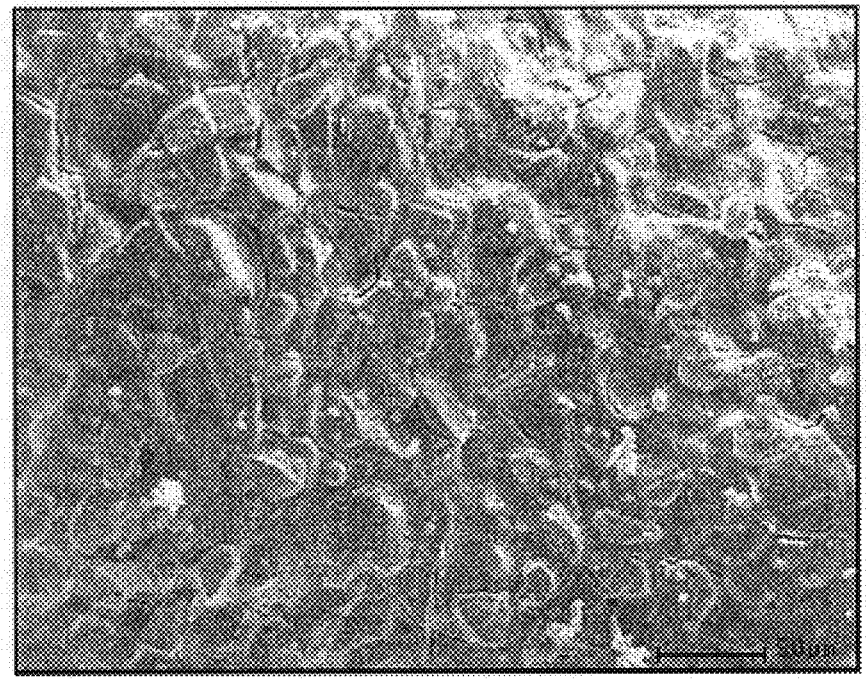
FIGURE 2

HIGH STRENGTH SIC FILTER AND METHOD FOR THE MANUFACTURE THEREOF

CROSS-REFERENCE TO PROVISIONAL PATENT APPLICATION

The benefit of U.S. Provisional Patent Application Ser. No. 60/327,420, filed Oct. 3, 2001, is claimed.

BACKGROUND OF THE INVENTION

The present invention relates to an improved ceramic foam filter for filtering molten metal, in particularly, iron and iron based metal alloys, and a process for preparing the same. More particularly, the present invention relates to ceramic foam filters having silicon carbide as the ceramic component, which is used in the filtration of iron and iron based alloys.

It is known in the art to employ porous ceramic foam filters to filter molten metal, especially aluminum, as described in U.S. Pat. Nos. 3,893,917 and 3,947,363. The materials for these aluminum filters often comprise primarily a phosphate bonded refractory material having certain other additions which have been fired to a temperature of about 2000° F. in order to mature the bond. While this type of refractory material is suitable for use in the aluminum industry, which easily withstands most aluminum alloys, which are typically cast to 1300° F., it is unsuitable for many other potential applications, such as iron and iron based alloys, due to low strength, poor chemical resistance and poor high temperature stability. It is thus desirable to use a material which maintains the favorable properties of ceramic foam aluminum filters, namely, high porosity, low pressure drop, high geometric surface area and tortuous path, but overcomes the foregoing difficulties of strength, chemical durability and temperature resistance.

U.S. Pat. No. 4,610,832 describes an improved ceramic foam filter and a process for preparing the same, which is particularly useful for high temperature applications, such as ferrous or steel filtration, based on the use of an aqueous slurry of thixotropic ceramic composition including a gelled alumina hydrate binder. It has been found that for certain applications, specialized running and gating systems are needed to insure priming of this filter, although, the filter does represent a significant improvement.

U.S. Pat. No. 4,975,191 describes a ceramic foam filter which is prepared from a ceramic slurry containing silicon carbide and colloidal silica (hereinafter referred to as "Early SiC Filter"). The Early SiC Filter has been very successful in filtering iron and ferrous alloys at high temperatures, normally up to 2700° F. The Early SiC Filter is readily primeable as a result of the wetting affect of the colloidal silica and has improved thermal properties.

The Early SiC Filter also contains a large amount of alumina, normally approximately 24% of the dry ingredients and 16% of the entire slurry, which acts as a binder for the silicon carbide. While alumina binder works well for filters used to filter molten aluminum, it is believed that the use of alumina in a silicon carbide iron filter lowers the strength, in particularly the hot strength, of the filter.

More recently, silicon carbide filters which utilize a smaller alumina content have been produced (hereinafter "Later SiC Filter"). Later SiC Filters contain a smaller amount of alumina, normally 6% of all of the dry ingredients and 3% of the entire slurry batch. The Later SiC Filters utilize a large amount of fused silica and a small amount of fumed silica as a binder which reduces the amount of alumina needed. One of the problems with both the Early SiC Filter and the Later SiC Filter is that the minimum density of the filters are limited due to insufficient strength. In order to provide a part with acceptable strength characteristics, one should create a part that has no less than 10% of the theoretical density. For certain applications, this density is not adequate. As a result, there is a minimum thickness that can be manufactured due to the strength limitations.

In addition, both Early SiC Filters and Later SiC Filters suffer from so-called rheology problems. That is, the slurry tends to run while no work is being performed on the slurry. When the organic foam used in the manufacture of the filter is impregnated with the slurry, it has been found that some of the slurry falls towards the bottom of the foam due to gravitational effects. This affects performance because one side of the filter can clog up during manufacture. It is believed that the use of alumina has adverse effects on rheology because of the need to use more water than is necessary to produce adequate flow. Thus it is desirable to provide an improved silicon carbide filter which overcomes the problems of the prior art.

As used herein, fumed silica means a material primarily made of silicon dioxide having an average particle size of less than 15 microns, and fused silica means a material primarily made of silicon dioxide having an average particle size of greater than 15 microns.

OBJECTS OF THE INVENTION

It is therefore one object of this invention to provide an improved silicon carbide ceramic foam filter.

It is another object of this invention to provide a silicon carbide ceramic foam filter having improved mechanical properties.

It is still another object to provide a silicon carbide ceramic foam filter which is produced from a slurry having improved rheology.

It is yet another object to provide a silicon carbide ceramic foam filter which may have a low theoretical density while maintaining strength.

It is also another object to provide a silicon carbide ceramic foam filter which has high breakage resistance at both hot and room temperatures.

SUMMARY OF THE INVENTION

In accordance with one form of this invention there is provided a ceramic foam filter for use in filtering molten metal. A filter body is provided, which is prepared from a ceramic slurry composition containing an amount of silicon carbide, an amount of colloidal silica, and at least 10% fumed silica. The filter body has an open cell structure with a plurality of interconnected voids surrounded by a web of ceramic. The amount of fumed silica in the slurry is such that the strength of the filter is substantially enhanced.

In accordance with another form of this invention there is provided a process for preparing a ceramic foam filter for filtering molten metal. An aqueous slurry of a ceramic composition is formed including an amount of silicon carbide, an amount of colloidal silica and at least 10% of fumed silica. A reticulated organic foam is provided. The foam is impregnated with the slurry. The impregnated foam is dried and heated to remove the organic component. The dried foam is fired at an elevated temperature to produce the ceramic foam filter.

BRIEF DESCRIPTION OF THE DRAWINGS

The subject matter which is regarded as the invention as set forth in the appended claims, the invention itself however, together with further objects and advantages thereof may be better understood in reference to the accompanying drawings in which:

FIG. 1 is a electron micrograph of the surface of a prior art silicon carbide ceramic foam filter.

FIG. 2 is a electron micrograph of the surface of the silicon carbide ceramic foam filter made using one embodiment of the subject invention.

DESCRIPTION OF THE PREFERRED EMBODIMENTS

Figure 3:
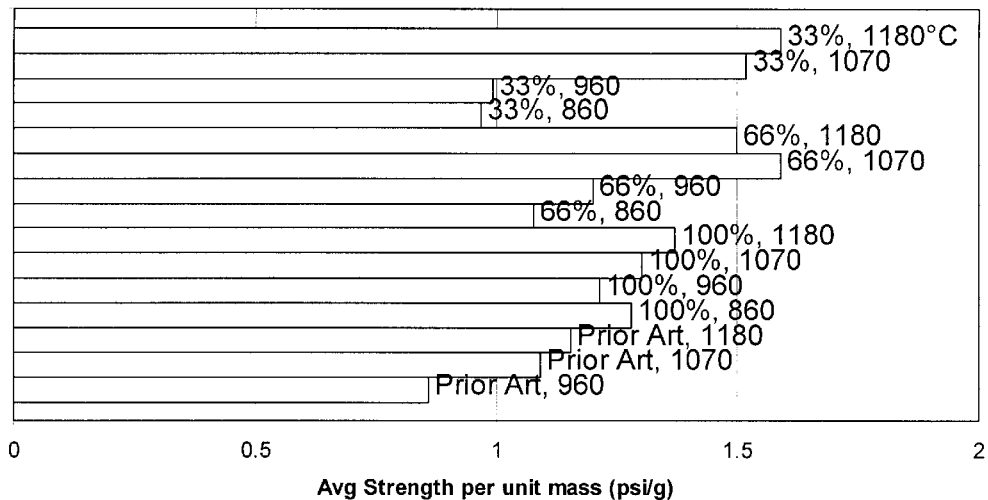
FIG. 3 is a bar chart comparing the average room temperature strength of a prior art ceramic foam filter, fired at various temperatures, with ceramic foam filters of one embodiment of the subject invention which have been fired at various temperatures and which are made using varying amounts of colloidal silica.

In accordance with the present invention, a ceramic foam filter is prepared from an open cell, flexible foam material having a plurality of interconnected voids surrounded by a web of the flexible foam material. Typical materials which may be used include polymeric foams, such as polyurethane and cellulosic foams. Generally, any combustible organic plastic foam may be used which has resilience and the ability to recover to original shape. The foam must be burned out or volatilized below the firing temperature of the ceramic material which is employed.

The aqueous ceramic slurry which is employed should be thixotropic, have a reasonable degree of fluidity, but with a rheology such that the slurry will tend to stay in place when work is not applied to it, in other words, a high yield strength. The major component of solid contents of the slurry is silicon carbide, which is the desired ceramic material, in an aqueous suspension.

A silicon carbide component preferably has a grain mesh size of −325 mesh, i.e., less than 44 microns. However, one can readily utilize silicon carbide with a grain mesh size of −270, i.e., less than 53 microns. Preferably, the weight percent of silicon carbide in the slurry is in the range of 50% to 60%. It is preferred that alumina not be used as a binder for the silicon carbide component because it is believed that the use of alumina will result in a decrease in strength characteristics of the filter.

The slurry includes an amount of colloidal silica for use as a binder for the silicon carbide and to improve the thixotropic characteristics of the slurry and to increase the primeability of the filter as a result of the wettability of silica. Preferably, the amount of colloidal silica used in the slurry is in the range of 5% to 20%. The colloidal dispersion of the silica is a stable non-settling suspension with a particle size of 1 micron or less.

The slurry also includes a substantial amount of fumed silica. Preferably, the amount of fumed silica in the slurry is in the range of 10% to 25%. The fumed silica serves as an excellent binding agent for the silicon carbide. The fumed silica, preferably, has an average diameter in the range of 4 to 5 microns. The fumed silica is used in lieu of alumina, which was used as a binding agent in Early SiC Filters. Fumed silica is used in lieu of most or all of the fused silica which was used in Later SiC Filters. The average particle size of the fumed silica is between 1 micron and 15 microns.

By using fumed silica, which is inexpensive, the amount of expensive colloidal silica from prior art formulations may be substantially reduced, which provides a substantial cost savings. Also a more desirable rheology is achieved because less water is needed due to the elimination of alumina in the preferred embodiment.

It is believed that the fumed silica acts as a better binder for the silicon carbide, and thus creates a stronger ceramic filter because the fine particles from the fumed silica fit more readily in between the particles of silicon carbide, while fused silica, which is a larger diameter particle, does not as readily fit between the particles of silicon carbide.

It has been found that when fumed silica replaces all of the fused silica, the resulting ceramic foam filter can become difficult to machine when using certain cutting instruments. Thus, in some situations, it is desirable to add some fused silica, which is larger in diameter than the fumed silica, to the slurry. While this will result in a less strong filter, it will enable one to more readily cut and shape the filter using most standard cutting instruments. Preferably, the amount of fused silica added to the formulation is in the range of 0% to 10%. The average particle size of the fused silica is between 15 microns and 30 microns.

FIG. 1 is an electron micrograph of the surface of a prior art silicon carbide filter bonded with a substantial amount of fused silica, with a small amount of fumed silica and with alumina, which has been fired at 1180° C. in roller hearth with a standard 20 minute cycle.

FIG. 2 is a electron micrograph of the surface of a silicon carbide filter of the subject invention bonded with fumed silica, that is, without the use of fused silica or alumina, and which was also fired at 1180° C. in roller hearth with a standard 20 minute cycle.

The electron micrographs show that the ceramic filter made with fumed silica and without alumina or fused silica is bonded more effectively than the ceramic foam filter made with fused silica.

FIG. 2 shows what appears to be a smooth glass-like coating on the surface and the matrix appears to be more continuous, while the surface shown in FIG. 1 is not smooth and the matrix appears to be discontinuous.

In accordance with the process of the present invention, one provides a reticulated organic polymer foam and impregnates the foam with the above described aqueous slurry. Detailed procedures for the preparation of ceramic foam for molten metal filters are described in U.S. Pat. Nos. 3,962,081, 4,075,303 and 4,024,212, disclosures of which are hereby incorporated by reference. The flexible foam material is impregnated with the above described aqueous ceramic slurry so that the fiber-like webs are coated therewith and the voids are filled therewith. Normally, it is preferred to simply immerse the foam in the slurry for a short period of time sufficient to ensure nearly complete impregnation of the foam. The pore size of the polymeric material may vary depending on the application, however, normally there are 3 pores per inch or greater. The larger pore sizes, in the range of 3 to 25 pores per inch, have been found to be particularly advantageous for iron and iron based alloy filtration in view of the higher total material throughput.

The impregnated foam is then compressed to expel a portion of the slurry while leaving the fiber-like web portion coated therewith with a plurality of pores throughout the body to increase flow path tortuosity.

In a continuous operation, one may pass the impregnated foam through a preset roller to affect the desired expulsion of the slurry from the foam and leave the desired amount impregnated therein. This may also be done manually by simply squeezing the flexible foam material to the desired extent. At this stage, the foam is flexible and may, if desired, by formed in configurations for suitable filtration tasks. It is necessary to hold the formed foam in position by conventional means until the organic substrate is decomposed.

The impregnated foam is then dried by suitable means, such as air drying, accelerated drying at a temperature of about 100° F. to 600° F. for 15 minutes to 6 hours, or by microwave drying. After drying, the material is fired at elevated temperatures in excess of 2000° F. to form the ceramic foam filter with temperatures up to 2500° F. being suitable. After firing, the resulting product is characterized by plurality of pores, as described above. Firing time at or near the peak temperature is at least 5 minutes and, generally, at least 10–15 minutes. Total firing times, including heating to and cooling from the peak temperature, of course, can widely vary, depending on the type of furnace.

The resulting product, as characterized here and above, has significant advantages, as discussed herein. Additional inorganic additives may be readily used in order to obtain particularly preferred properties.

EXAMPLE 1

In accordance with the present invention, the specific features will be more readily understandable from the following data. A thixotropic ceramic slurry was prepared from the following formula: 563.097 pounds of silicon carbide (approximately 56.3%), 218.298 pounds of fumed silica (approximately 21.8%), 106.511 pounds of colloidal silica (approximately 11%), 101.335 pounds of water (approximately 10%), 10.523 pounds of mineral colloid (approximately 1%), and 0.235 pounds of aquathix (approximately 0.0235%).

This specific aforesaid slurry was used to impregnate an open cell flexible polyurethane foam. The fiber-like webs were coated therewith and the voids filled therewith. Impregnation was accomplished by immersing the foam samples in the slurry and using preset rollers to compress the foam and expel a portion of the slurry while leaving the fiber-like web portion coated therewith and a plurality of pores throughout the body to increase flow path tortuosity. The resulting impregnated foams were dried and heated to remove the organic component therefrom, and then fired at approximately 1180° C. for 10 minutes. The resulting ceramic foam samples are characterized by an open cell structure having a plurality of interconnected voids surrounded by a web of ceramic.

The specific aforesaid slurry utilized approximately 40% of the standard amount of colloidal silica used to make Later SiC Filters, thereby resulting in a substantial cost saving. The room temperature strength per mass unit of the filters made using this composition were found to be nearly 2 times greater than the Later SiC Filters. In addition, the high temperature strength of this new formulation was nearly 2.5 times greater than Later SiC Filters.

In order to derive an optimum formulation set forth in Example 1, an experiment was conducted by substituting the alumina and fused silica from prior art formulations with fumed silica. The colloidal silica content and the firing temperature were varied in order to determine the best room temperature and high temperature strengths. The experiment utilized four temperature variables and three different levels of colloidal silica. The temperatures were 860° C., 960° C., 1070° C., and 1180° C. The colloidal silica contents were standard, i.e., 100% of the amount used to produce the prior art silicon carbide filters (i.e., Later SiC Filters), 66% of standard, and 33% of standard. In cases where some of the colloidal silica were moved from the standard amount, water was added. About 60% of the colloidal silica by weight is water, so extra water was needed to achieve a workable slurry, although the total amount of water needed in cases where less colloidal silica was added was reduced.

These new formulations which utilized fumed silica in lieu of alumina and fused silica were compared with a prior art formulation which utilize both alumina and fused silica. Both independent variables were optimized simultaneously. The samples were 82×82×13 mm and were strength tested in a three point bend configuration at cross-head speed of 0.5 inch per minute for high temperature tests and 0.1 inch per minute for room temperature tests.

FIG. 3 shows room temperature strength per unit mass for all of the composition formulations.

Figure 4:
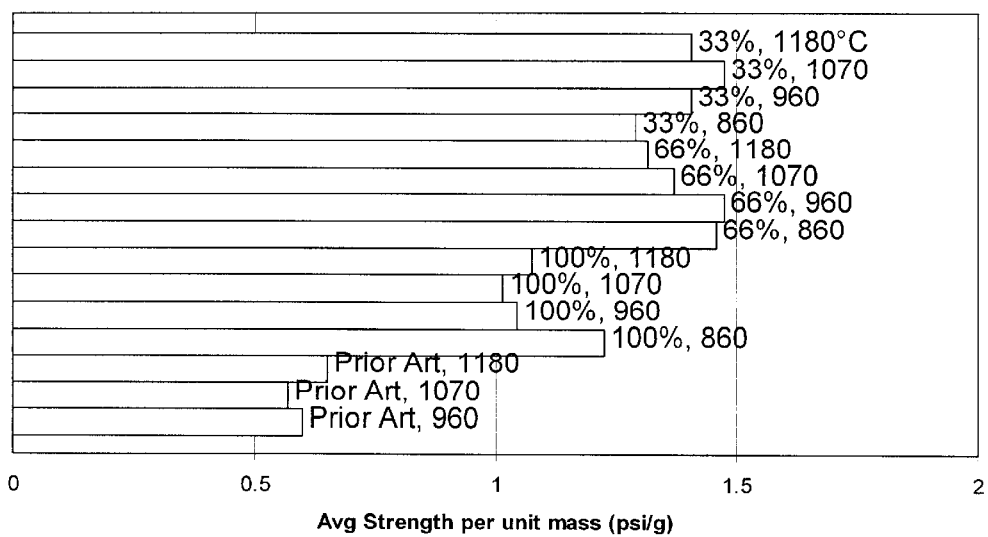
FIG. 4 is a bar chart comparing the average high temperature strength of a prior art ceramic foam filter, fired at various temperatures, with ceramic foam filters of one embodiment of the subject invention which have been fired at various temperature and which are made using varying amounts of colloidal silica.

FIG. 4 shows high temperature strength per unit mass for all of the tested formulations.

For the high temperature tests, samples were inserted directly from room temperature into a furnace held at 1428° C. The time from insertion to failure was 45 seconds. It is clear from the experiment that the substitution of fumed silica for fused silica and alumina substantially increased the strength of the filters for all levels of colloidal silica and at all firing temperatures. The optimum was found to be about 1070° C. firing temperature and 40% of the standard amount of colloidal silica. The new composition resulted in a filter which is nearly 2 times stronger than the prior art silicon carbide filters at room temperature, and the high temperature strength was nearly 2.5 times greater.

Not only does the new slurry make stronger parts, but is also less expensive to manufacture. Alumina and fused silica are roughly 2–3 times more costly than fumed silica. In addition, the new slurry only requires 40% of the standard amount of colloidal silica, which is very expensive. Because there is less water in the new slurry composition, less energy is required to dry the blanks, which is obviously an advantage both from a time and a cost standpoint. The ideal firing temperature with a new composition is at least 1070° C., which is 110° C. lower than the standard firing temperature of 1180° of prior art silicon carbide filters. Thus energy is saved. Fired blanks made from this new composition slurry are substantially stronger than those made from the existing slurry types, and this increased strength will allow for a thinner minimum thickness. The increased strength will allow for a broader range of density, less mass and substantial cost savings due to reduced materials required to coat the foam.

There appears to be a link between the increased strength in the filters and the use of substantial amounts of fumed silica as a binding agent. It is believed that the fumed silica likely bonds more effectively than does alumina and fused silica with other components in the slurry at the firing temperature used. The alumina also probably disperses poorly in the system because the pH is near a value of 9–10. By removing alumina from the system, less total water is needed to create well dispersed and stable slurry.

Fumed silica has a much lower coefficient of thermal expansion than alumina, presenting less of a thermal mismatch with the other components in the slurry.

There also appears to be a correlation between the amount of colloidal silica binder used and the strength. The colloidal silica behaves as a flux, i.e., helps in bonding, and as a binder by promoting the other powders in the mixtures to react with each other.

EXAMPLE 2

An additional slurry was prepared having a formulation exactly the same as the formulation in Example 1, except that the amount of fumed silica which was used was 167 pounds (approximately 17%) and 42 pounds (approximately 4%) of fused silica was added. This resulted in a slightly less strong filter which was easier to cut and to shape. It is believed that up to 10% of the fused silica may be added without degrading the strength so long as a substantial amount of fumed silica is used.

From the foregoing description of the preferred embodiments of the invention, it will be apparent that many modifications may be made therein. It should be understood, however, that these embodiments of the invention are an exemplification of the invention only and that the invention is not limited thereto. It is to be understood therefore that it is intended in the appended claims to cover all modifications as fall within the true spirit and scope of the invention.

What is claimed is:

1. A ceramic foam filter for use in filtering molten metal comprising:
   a filter body prepared from a ceramic slurry composition containing an amount of silicon carbide, an amount of colloidal silica, and at least 10% of fumed silica;
   said filter body having an open cell structure with a plurality of interconnected voids surrounded by a web of said ceramic, whereby the amount of fumed silica is such that the strength of the filter is substantially enhanced.

2. A ceramic foam filter as set forth in claim 1, wherein the ceramic slurry composition contains up to 10% of fused silica.

3. A ceramic foam filter as set forth in claim 1, wherein the composition contains at least 50% silicon carbide.

4. A ceramic foam filter as set forth in claim 1, wherein the composition contains at least 5% colloidal silica.

5. A ceramic foam filter as set forth in claim 1, wherein the amount of fumed silica in the composition is in the range of 10% to 25%.

6. A ceramic foam filter as set forth in claim 3, wherein the amount of silicon carbide in the composition is in the range of 50% to 60%.

7. A ceramic foam filter as set forth in claim 4, wherein the colloidal silica component of the composition is in the range of 5% to 20%.

8. A ceramic foam filter as set forth in claim 1, wherein the composition contains substantially no alumina.

9. A process for preparing a ceramic foam filter for filtering molten metal comprising the steps of:
   forming an aqueous slurry of ceramic composition including an amount of silicon carbide, an amount of colloidal silica, and at least 10% fumed silica;
   providing a reticulated organic polymer foam;
   impregnating the foam with the slurry;
   drying and heating the impregnated foam to remove the organic component, and firing at an elevated temperature to produce a ceramic foam filter.

10. A process as set forth in claim 9, wherein the composition contains up to 10% of fused silica.

11. A process as set forth in claim 9, wherein the composition contains at least 50% silicon carbide.

12. A process as set forth in claim 9, wherein the composition contains at least 5% colloidal silica.

13. A process as set forth in claim 9, wherein the fumed silica component of the composition is in the range of 10% to 25%.

14. A process as set forth in claim 11, wherein the silicon carbide component of the composition is in the range of 50% to 60%.

15. A process as set forth in claim 12, wherein the colloidal silica component of the composition is in the range of 5% to 20%.

16. A process as set forth in claim 9, wherein the composition contains substantially no alumina.

* * * * *